US012175305B2

(12) United States Patent
Spector et al.

(10) Patent No.: US 12,175,305 B2
(45) Date of Patent: Dec. 24, 2024

(54) SYSTEMS AND METHODS FOR DETERMINISTICALLY LINKING MOBILE APPLICATIONS

(71) Applicant: JPMORGAN CHASE BANK, N.A., New York, NY (US)

(72) Inventors: Howard Spector, Woolwich, NJ (US); David Christopher Carey, Middletown, DE (US); Indeevara H. De Silva, Lewis Center, OH (US); Sridhar Aravamudhan, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 106 days.

(21) Appl. No.: 17/071,666

(22) Filed: Oct. 15, 2020

(65) Prior Publication Data

US 2021/0117250 A1 Apr. 22, 2021

Related U.S. Application Data

(60) Provisional application No. 62/916,446, filed on Oct. 17, 2019.

(51) Int. Cl.
*G06F 9/54* (2006.01)
*G06F 9/445* (2018.01)
(Continued)

(52) U.S. Cl.
CPC .......... *G06F 9/541* (2013.01); *G06F 9/44521* (2013.01); *G06Q 20/108* (2013.01);
(Continued)

(58) Field of Classification Search
CPC ... G06F 9/541; G06F 9/44521; G06Q 20/326; G06Q 20/108; G06Q 20/3223;
(Continued)

(56) References Cited

U.S. PATENT DOCUMENTS 9,430,302 B2 * 8/2016 Zhao ....................... G06F 9/541
2013/0024371 A1 * 1/2013 Hariramani .......... G06Q 20/384
705/41

(Continued)

FOREIGN PATENT DOCUMENTS

WO 2017120605 7/2017

OTHER PUBLICATIONS

M. Sajić, D. Bundalo, Z. Bundalo and D. Pašalić, "Using digital and mobile technologies for increasing efficiency of financial institutions," 2017 25th Telecommunication Forum (TELFOR), 2017, pp. 1-4, doi: 10.1109/TELFOR.2017.8249405. (Year: 2017).*

(Continued)

*Primary Examiner* — David P Sharvin
*Assistant Examiner* — Steven R Chism
(74) *Attorney, Agent, or Firm* — GREENBERG TRAURIG LLP

(57) ABSTRACT

A mobile computer application may (1) access a financial institution mobile application to determine if there is an account that is eligible for provisioning to the mobile computer application; (2) initiate a secure session with the financial institution backend in response to a determination that there is an account eligible for provisioning to the mobile computer application; (3) request an identification of an account that is eligible for provisioning to the mobile computer application from the financial institution backend; (4) receive a pointer to an account that is eligible for provisioning to the mobile computer application from the financial institution backend; (5) display an icon for the eligible account; (6) receive a selection of the icon; (7) return the pointer to the financial institution backend; (8) receive a provisioning payload for the eligible account from the financial institution backend; and (9) initiate in-application provisioning of the eligible account.

10 Claims, 6 Drawing Sheets

(51) Int. Cl.
  *G06Q 20/10* (2012.01)
  *G06Q 20/32* (2012.01)
  *G06Q 20/36* (2012.01)
  *G06Q 30/018* (2023.01)
  *G06Q 40/02* (2023.01)
  *H04L 67/146* (2022.01)

(52) U.S. Cl.
  CPC ....... *G06Q 20/3223* (2013.01); *G06Q 20/326* (2020.05); *G06Q 20/3672* (2013.01); *G06Q 20/3674* (2013.01); *G06Q 30/0185* (2013.01); *G06Q 40/02* (2013.01); *H04L 67/146* (2013.01); *G06Q 2220/00* (2013.01)

(58) Field of Classification Search
  CPC .......... G06Q 20/3672; G06Q 30/0185; G06Q 40/02; H04L 67/146
  See application file for complete search history.

(56) References Cited

U.S. PATENT DOCUMENTS

| | | | | |
|---|---|---|---|---|
| 2015/0046339 A1* | 2/2015 | Wong | ................ | G06Q 20/4016 705/44 |
| 2016/0019536 A1* | 1/2016 | Ortiz | .................. | G06Q 20/3227 705/67 |
| 2016/0094991 A1 | 3/2016 | Powell et al. | | |
| 2017/0011390 A1* | 1/2017 | Hsieh | ..................... | G06Q 20/36 |
| 2017/0116424 A1* | 4/2017 | Aamir | ................... | G06F 21/606 |
| 2018/0276657 A1* | 9/2018 | Cho | ................... | G06Q 20/3223 |
| 2018/0293573 A1 | 10/2018 | Ortiz et al. | | |
| 2020/0036695 A1* | 1/2020 | Sharp | ................... | G06Q 20/326 |
| 2020/0118205 A1* | 4/2020 | Bloy | ................. | G06Q 20/3223 |

OTHER PUBLICATIONS

F. Cheng, "A Trusted Smart Phone and its Applications in Electronic Payment," 2010 International Forum on Information Technology and Applications, Kunming, China, 2010, pp. 405-408, doi: 10.1109/IFITA.2010.256. (Year: 2010).*

International Search Report, dated Jan. 14, 2021, from corresponding International Application No. PCT/US2020/056041.

Written Opinion of the International Searching Authority, dated Jan. 14, 2021, from corresponding International Application No. PCT/US2020/056041.

* cited by examiner

SYSTEMS AND METHODS FOR DETERMINISTICALLY LINKING MOBILE APPLICATIONS

RELATED APPLICATIONS

This application claims priority to, and the benefit of, U.S. Provisional Patent Application Ser. No. 62/916,446 filed Oct. 17, 2019, the disclosure of which is hereby incorporated, by reference, in its entirety.

BACKGROUND OF THE INVENTION

1. Field of the Invention

Embodiments generally relate to systems and methods for deterministically linking mobile applications.

2. Description of the Related Art

Mobile applications on electronic devices are able to determine if another application is loaded on the same device. Despite this ability, that may not be enough to determine if the applications should be linked in a business meaningful way.

SUMMARY OF THE INVENTION

Systems and methods for deterministically linking mobile applications are disclosed. In one embodiment, in a mobile electronic device comprising at least one computer processor executing a mobile computer application, a method for deterministically linking mobile applications may include: (1) the mobile computer application accessing a financial institution mobile application to determine if there is an account that is eligible for provisioning to the mobile computer application; (2) the mobile computer application initiating a secure session with the financial institution backend in response to a determination that there is an account eligible for provisioning to the mobile computer application; (3) the mobile computer application requesting an identification of an account that is eligible for provisioning to the mobile computer application from the financial institution backend; (4) the mobile computer application receiving a pointer to an account that is eligible for provisioning to the mobile computer application from the financial institution backend; (5) the mobile computer application displaying an icon for the eligible account; (6) the mobile computer application receiving selection of the icon; (7) the mobile computer application returning the pointer to the financial institution backend; (8) the mobile computer application receiving a provisioning payload for the eligible account from the financial institution backend; and (9) the mobile computer application initiating in-application provisioning of the eligible account.

In one embodiment, the mobile computer application may be an electronic wallet application. The mobile computer application may be a third-party electronic wallet application.

In one embodiment, the financial institution mobile application may be a financial institution electronic wallet application.

In one embodiment, the mobile computer application may verify that the financial institution mobile application associated with a financial institution backend is present on the mobile electronic device. The mobile computer application may use an API exposed by an operating system of the mobile electronic device.

In one embodiment, the mobile computer application may determine that there is an account that is eligible for provisioning to the mobile computer application based on a payload stored by the financial institution mobile application.

In one embodiment, the mobile computer application may identify a financial institution mobile application that is installed on the mobile electronic device.

According to another embodiment, in a mobile electronic device comprising at least one computer processor executing a mobile computer application, a method for deterministically linking mobile applications may include: (1) the mobile computer application determining that a financial institution mobile application associated with a financial institution backend is not present on the mobile electronic device; (2) the mobile computer application retrieving a cookie from the mobile electronic device from a prior session with the financial institution backend; (3) the mobile computer application providing the cookie to the financial institution in a browser session; (4) the mobile computer application receiving verification from the financial institution that there are eligible accounts for provisioning to the mobile computer application; (5) the mobile computer application initiating a secure session with the financial institution backend in response to a determination that there is an account eligible for provisioning to the mobile computer application; (6) the mobile computer application requesting an identification of an account that is eligible for provisioning to the mobile computer application from the financial institution backend; (7) the mobile computer application receiving a pointer to an account that is eligible for provisioning to the mobile computer application from the financial institution backend; (8) the mobile computer application displaying an icon for the eligible account; (9) the mobile computer application receiving selection of the icon; (10) the mobile computer application returning the pointer to the financial institution backend; (11) the mobile computer application receiving a provisioning payload for the eligible account from the financial institution backend; and (12) the mobile computer application initiating in-application provisioning of the eligible account.

In one embodiment, the mobile computer application may be an electronic wallet application. The mobile computer application may be a third-party electronic wallet application.

In one embodiment, the financial institution mobile application may be a financial institution electronic wallet application.

In one embodiment, the mobile computer application may determine that the financial institution mobile application associated with a financial institution backend is not present on the mobile electronic device using an API exposed by an operating system of the mobile electronic device.

In one embodiment, the prior session with the financial institution may include a prior browser session with the financial institution.

According to another embodiment, in a mobile electronic device comprising at least one computer processor executing a mobile computer application, a method for deterministically linking mobile applications may include: (1) the mobile computer application identifying a financial institution mobile computer application associated with a financial institution backend on the mobile electronic device; (2) the mobile computer application accessing the financial institution mobile computer application to determine if there is an account that is eligible for tokenization to the mobile computer application; (3) the mobile computer application displaying the account that is eligible for tokenization; (4) the mobile computer application receiving selection of the account; (5) the mobile computer application requesting a provisioning payload for the selected account from the financial institution mobile computer application; (6) the mobile computer application receiving a provisioning payload for the eligible account from the financial institution mobile computer application, the financial institution mobile computer application receiving the provisioning payload from the financial institution backend; and (7) the mobile computer application initiating in-application provisioning of the eligible account.

In one embodiment, the mobile computer application may be an electronic wallet application. The mobile computer application may be a third-party electronic wallet application.

In one embodiment, the financial institution mobile application may be a financial institution electronic wallet application.

In one embodiment, the mobile computer application may verify that the financial institution mobile application associated with a financial institution backend is present on the mobile electronic device. The mobile electronic device may use an API exposed by an operating system of the mobile electronic device.

In one embodiment, the mobile computer application may determine that there is an account that is eligible for provisioning to the mobile computer application based on a payload stored by the financial institution mobile application.

In one embodiment, the mobile computer application may identify a financial institution mobile application that is installed on the mobile electronic device.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Systems and methods for deterministically linking mobile applications are disclosed.

In embodiments, a user may interact with, or log into, a first mobile application that is trying to be detected by a second mobile application (or the operating system of an electronic device) to obtain data that may be used to influence how the second mobile application (and other applications) surface the existence of the first mobile application. Once detected, the second mobile application or operating system may change its behavior based on the data being exposed by the first mobile application. For example, a second mobile application may change its user interface to support more complex interactions with specific accounts or other data the first mobile application exposes.

In embodiments, the first mobile application may share data by using a custom URL or similar function that may alert the operating system or second application that not only is the first mobile application present, but also has the correct state to be accessed. This state could be driven by the types of accounts or the status of those accounts or some other combination of data that the host system for the first mobile application maintains.

The first mobile application may receive a unique id from the operating system or second mobile application that may then be used to share this information either directly on the device or via a secure server to server communication pattern.

If the first mobile application does not have the proper state, the second mobile application or operating system may either suppress the functionality or change the functionality in a way as to encourage the user of the first mobile application to make the required account or setting changes to ensure proper linking.

Figure 1:
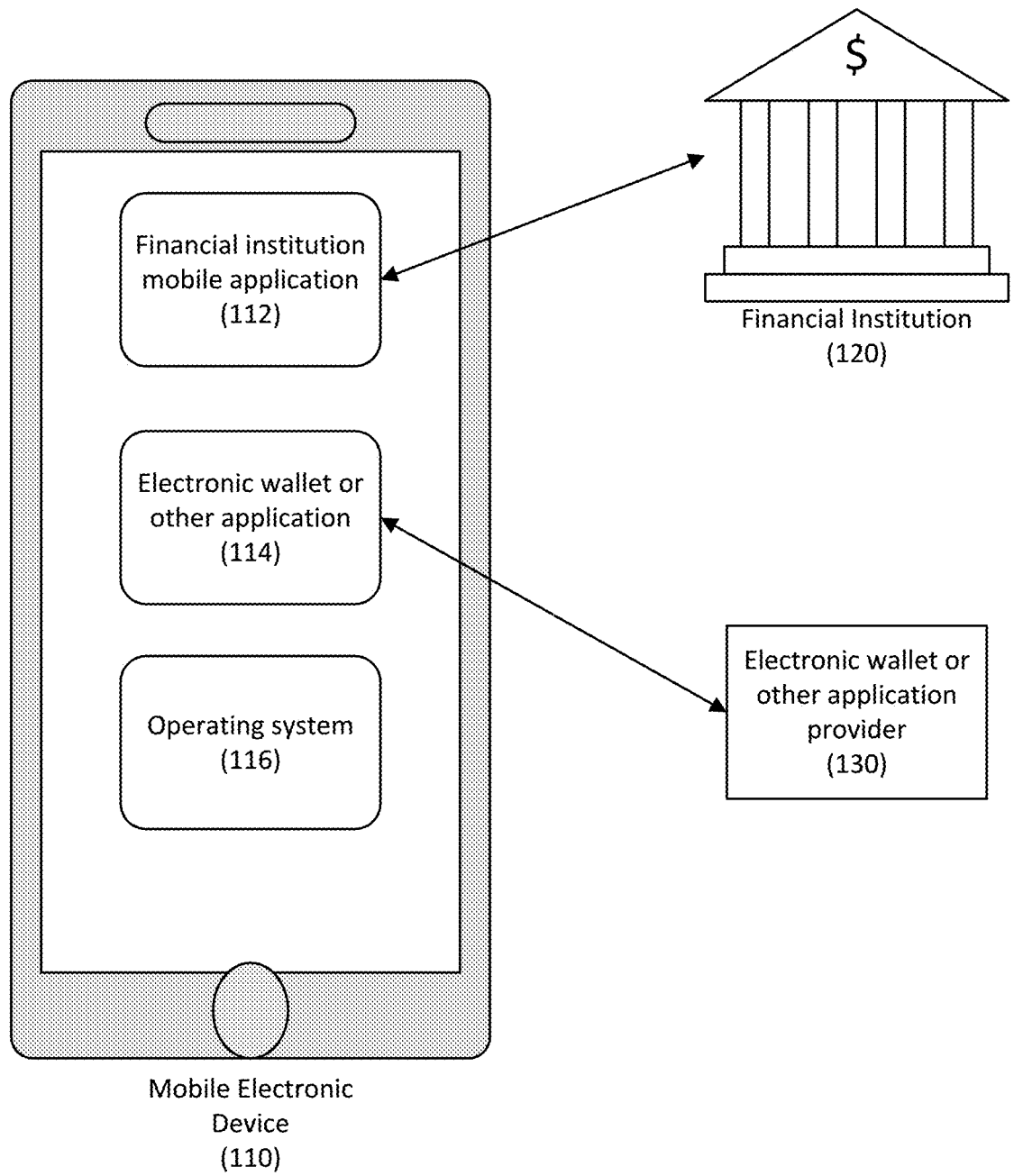
FIG. 1 discloses a system for deterministically linking mobile applications according to one embodiment.

Referring to FIG. 1, a system for deterministically linking mobile applications is disclosed according to one embodiment. The system may include mobile electronic device 110, which may be any suitable electronic device that may execute computer programs or applications, including computers, smartphones, smart watches, Internet of Things ("IoT") appliances, etc.

Mobile electronic device 110 may execute one or more computer program, including financial institution mobile application 112 that may be associated with financial institution 120, and electronic wallet or other application 114 that may be associated with electronic wallet or other application provider 130. Mobile electronic device 110 may also execute operating system 116, and other computer programs and applications, such as web browsers and the like (not shown).

Financial institution 120 may be, for example, an issuer of financial instruments, such as credit cards.

In one embodiment, financial institution 120 and electronic wallet or other application provider 130 may be the same, or part of the same organization. In another embodiment, financial institution 120 and electronic wallet or other application provider 130 may be with different organizations.

It should be recognized that although embodiments may be disclosed in the context of electronic wallets and electronic wallet applications, which are mobile applications, any other suitable computer application, mobile application, etc. may be used as is necessary and/or desired.

Figure 2:
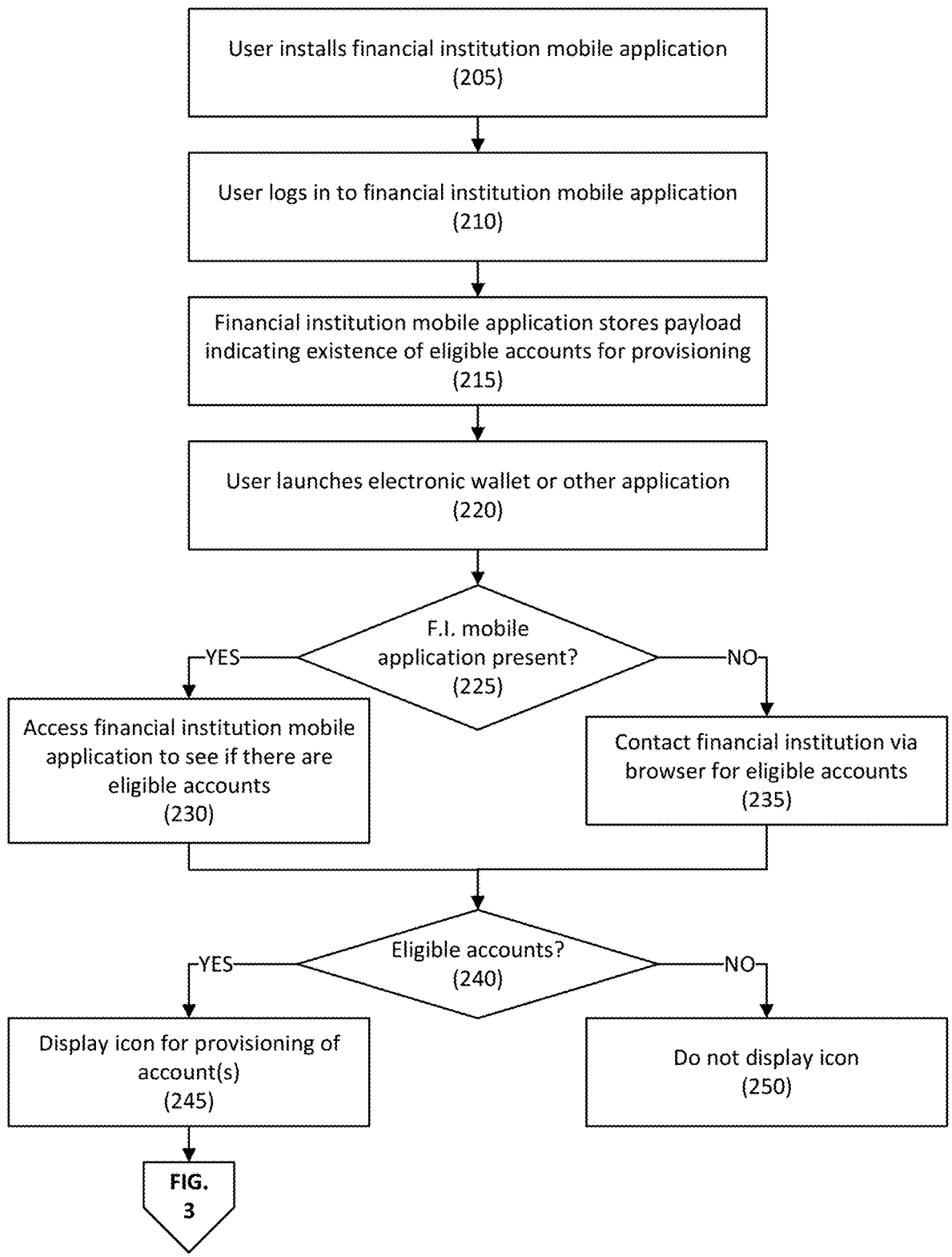
FIGS. 2 and 3 depict a method for deterministically linking mobile applications according to one embodiment.

Referring to FIG. 2, a method for deterministically linking mobile applications is disclosed according to one embodiment. In step 205, a user may install a financial institution mobile application on a mobile electronic device, and in step 210, the user may log in to the mobile application in any suitable manner (e.g., username and password, biometrics, out of band authentication, etc.).

In step 215, the financial institution mobile application may store a payload on the mobile electronic device that may indicate the existence of one or more financial accounts that may be eligible for provisioning to a mobile application, such as an electronic wallet application. In one embodiment, the payload may not include any personally-identifiable information (PII). In one embodiment, the financial institution mobile application may update this payload after every user login.

In step 220, the user may launch an electronic wallet or other application. An example of such an application is ApplePay. Other applications may be used as is necessary and/or desired.

In step 225, the electronic wallet or other application may check to see if the financial institution mobile application is present on the mobile electronic device. In one embodiment, an API provided by the mobile device's operating system may be used to identify the list of applications on the mobile electronic device that support linking. In another embodiment, the operating system may not expose a list of applications, and the electronic wallet or other application may need to identify the financial institution mobile application in the request.

If it is, in step 230, the electronic wallet or other application may access the financial institution mobile application to determine if there are any eligible accounts for provisioning.

If the electronic wallet or other application determines that the financial institution mobile application is not installed, in one embodiment, the process may stop, and no provisioning icon may be presented in the electronic wallet or other application.

In another embodiment, the electronic wallet or other application may retrieve a cookie on the electronic device that may indicate whether or not there are eligible accounts.

In still another embodiment, the electronic wallet may open a browser window and contact the financial institution to determine if there are eligible accounts for provisioning. In one embodiment, the electronic wallet or other application may retrieve a cookie or similar identifier on the mobile electronic device from a prior session (e.g., a browser session) with the financial institution, and may provide the cookie to the financial institution to identify the user. The financial institution may use lightweight authentication or similar to return a binary yes or no to the electronic wallet or other application.

In step 240, if there are not any eligible accounts, the process may stop, and no provisioning icon may be presented in the electronic wallet or other application.

Figure 3:
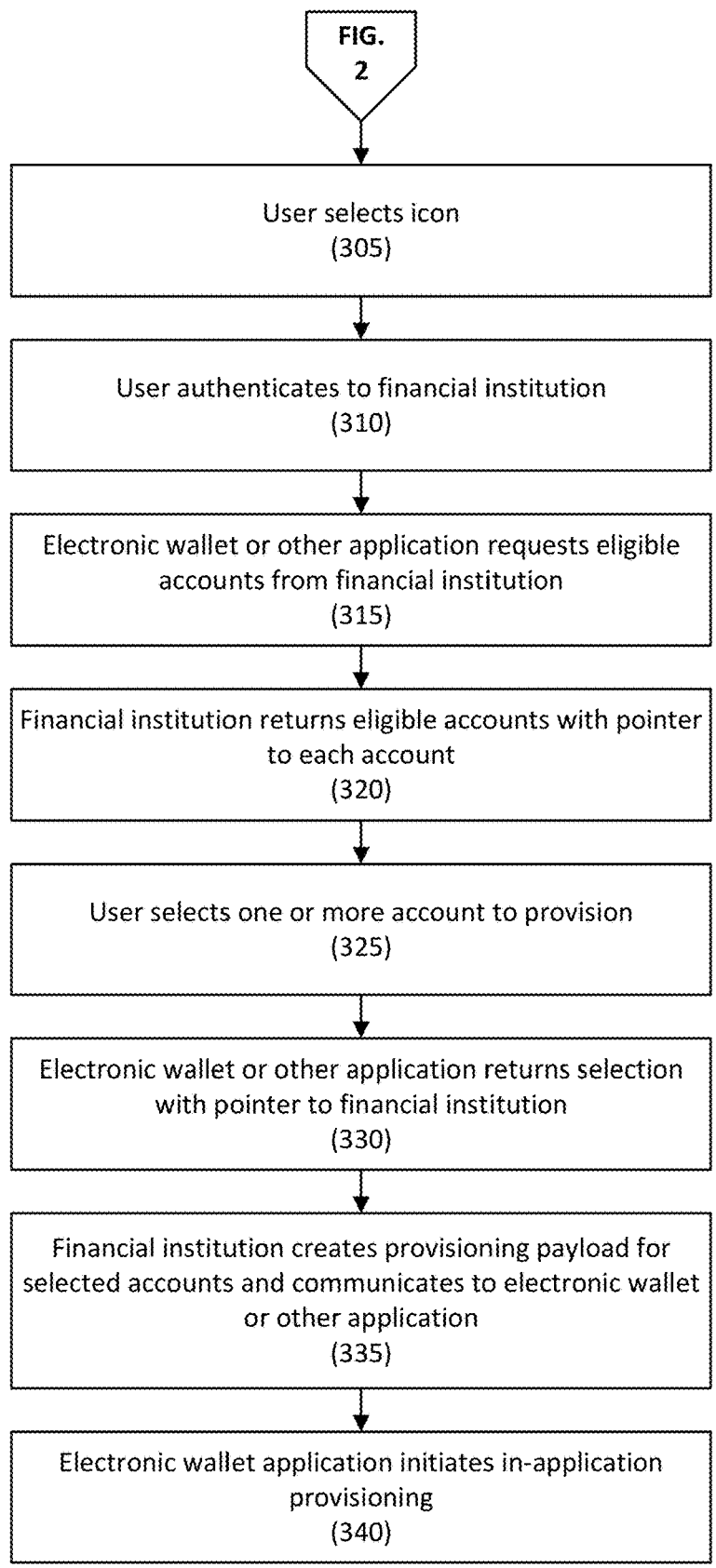

If there are eligible accounts, in step, a provisioning icon may be displayed in the electronic wallet or other application. For example, the icon may include a graphic, logo, etc. for the financial institution and instructions to select the icon to provision an account that the user has with the financial institution to the electronic wallet or other application. The process may continue with step 305 in FIG. 3.

In step 305, the user may select the icon, and in step 310, the user may authenticate to the financial institution. In one embodiment, a lightbox or similar may be presented in the electronic wallet or other application, and the user may provide login credentials to the financial institution. In another embodiment, the electronic wallet or other application may launch a browser window and navigate to the financial institution for the user to enter login credentials.

The electronic wallet or other application, the financial institution, and the electronic device may then establish a secure session using, for example, an OAuth token.

In step 315, using the OAuth token, the electronic wallet or other application may request the one or more eligible accounts from the financial institution. In one embodiment, the electronic wallet or other application may use an exposed API.

In step 320, the financial institution may return a list of eligible accounts to the electronic wallet or other application. In one embodiment the financial institution may return, for example, card art, the last four digits, and a pointer for each account, and may not provide actual account information.

In one embodiment, the financial institution may map each account pointer to one of the eligible accounts.

In step 325, the electronic wallet or other application may display the eligible accounts for the user, and the user may select one or more eligible accounts to provision.

In step 330, the electronic wallet or other application may return the selected account(s) and the account pointer(s) with the OAuth token to the financial institution. In one embodiment, the electronic wallet or other application may use an exposed API.

In step 335, the financial institution may create a provisioning payload for the selected account(s). The financial institution may then communicate the provisioning payload to the electronic wallet or other application.

In step 340, the electronic wallet or other application may initiate in-application provisioning using the provisioning payload.

Figure 4:
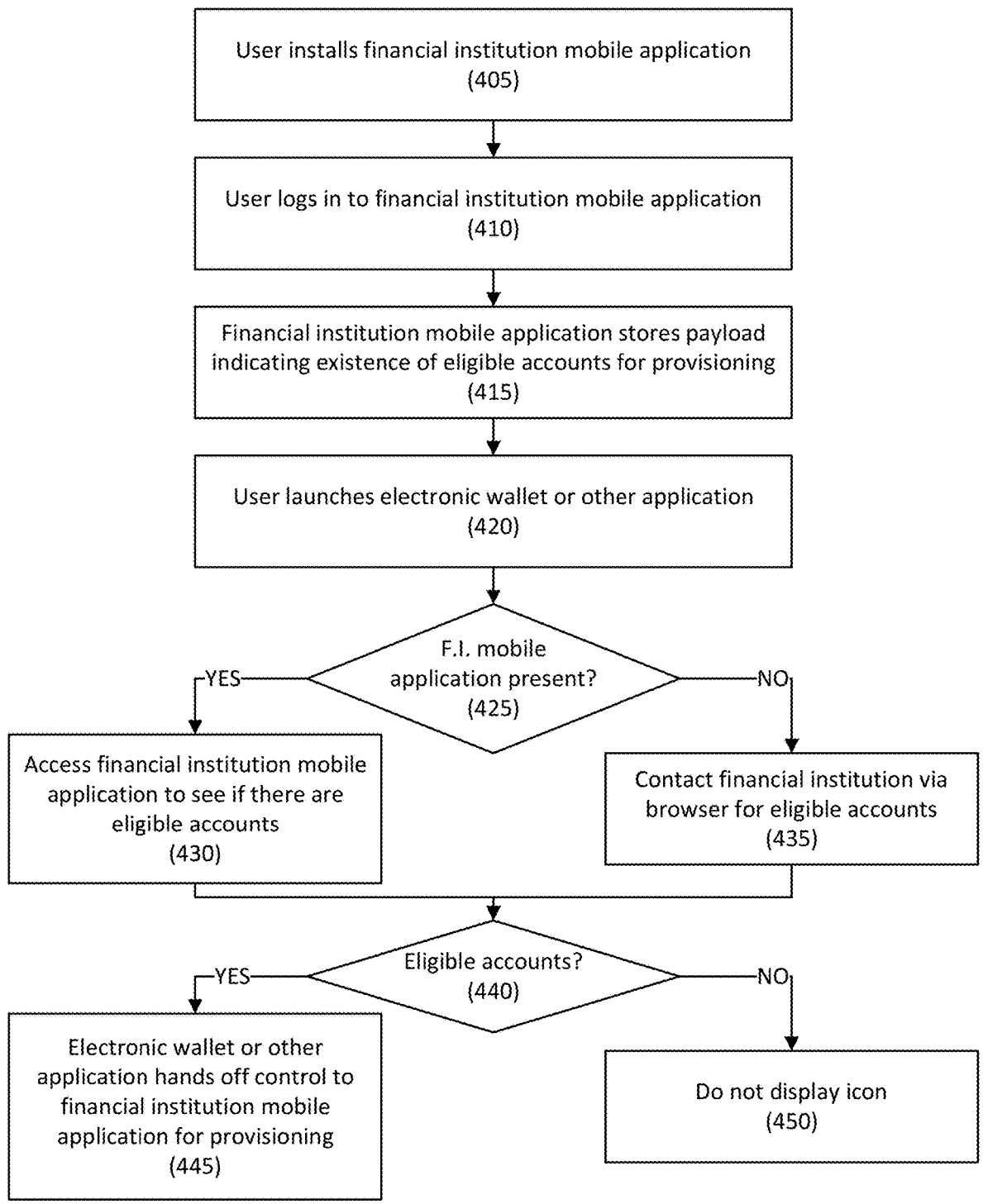
FIG. 4 depicts a method for deterministically linking mobile applications according to another embodiment.

Referring to FIG. 4, a method for deterministically linking mobile applications is disclosed according to one embodiment. Steps 405-440 and 450 are similar to steps 205-240 and 250 discussed above.

If there are eligible accounts, in step 445, the electronic wallet or other application may hand off control to the financial institution mobile application to provision the selected account(s) to the electronic wallet or other application.

Figure 5:
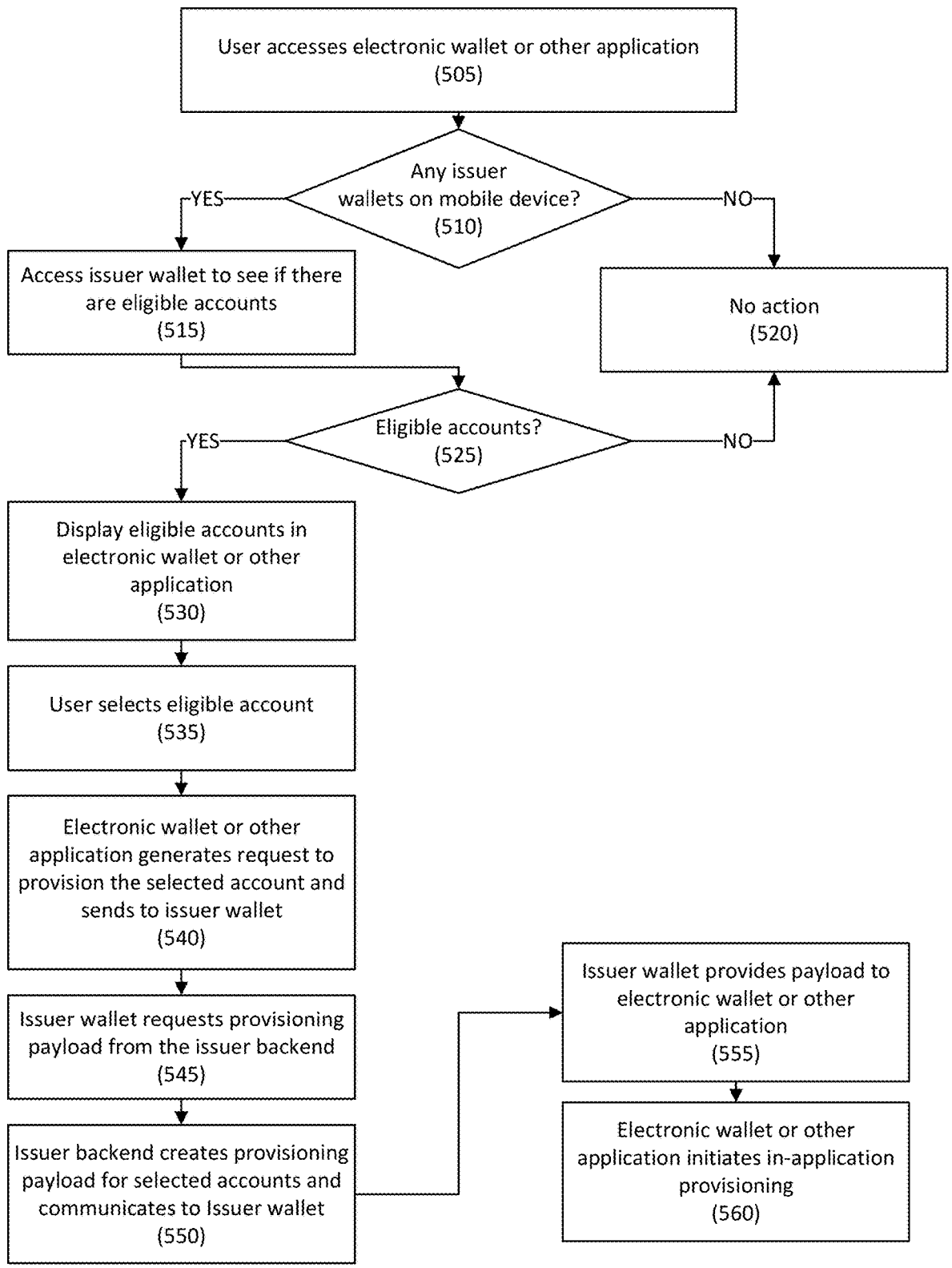
FIG. 5 depicts a method for deterministically linking mobile applications according to another embodiment.

Referring to FIG. 5, a method for deterministically linking mobile applications according to another embodiment.

In step 505, a user may access a mobile application, such as an electronic wallet or other application, on a mobile electronic device. This may be similar to step 220, above.

In step 510, the electronic wallet or other application may determine whether there are any issuer electronic wallet or other applications on the mobile electronic device. This may be similar to step 225, above.

If, in step 515, there are no issuer electronic wallet or other applications on the mobile electronic device, in step 520, the process may stop.

If there is one or more issuer electronic wallet or other application on the mobile electronic device, in step 515, the electronic wallet or other application may access the issuer electronic wallet or other application(s) to identify accounts that are eligible for provisioning to the electronic wallet or other application. In one embodiment, the issuer electronic wallet or other application may return account eligibility to the electronic wallet or other application by, for example, executing eligibility rules, checking with the issuer backend, etc.

If, in step 525, there are no accounts that are eligible for provisioning to the electronic wallet or other application, in step 520, no action is taken.

If, in step 525, there is one or more account that is eligible for provisioning to the electronic wallet or other application, in step 530, the eligible accounts are displayed in the electronic wallet or other application. In one embodiment, an icon and an account identifier (e.g., the issuer, an account nickname, last four digits of the account number, etc.), may be displayed.

In step 535, the user may select an eligible account from the list presented in the electronic wallet or other application.

In step 540, the electronic wallet or other application may generate a request to provision the selected account and may communicate the request to the issuer electronic wallet or other application.

In step 545, the issuer electronic wallet or other application may request a provisioning payload from the issuer backend.

In step 550, the issuer backed may generate a provisioning payload for the selected account and may provide the provisioning payload to the issuer electronic wallet or other application.

In step 555, the issuer electronic wallet or other application may provide the provisioning payload to the electronic wallet or other application, and in step 560, the electronic wallet or other application may initiate in-application provisioning using the provisioning payload.

Figure 6:
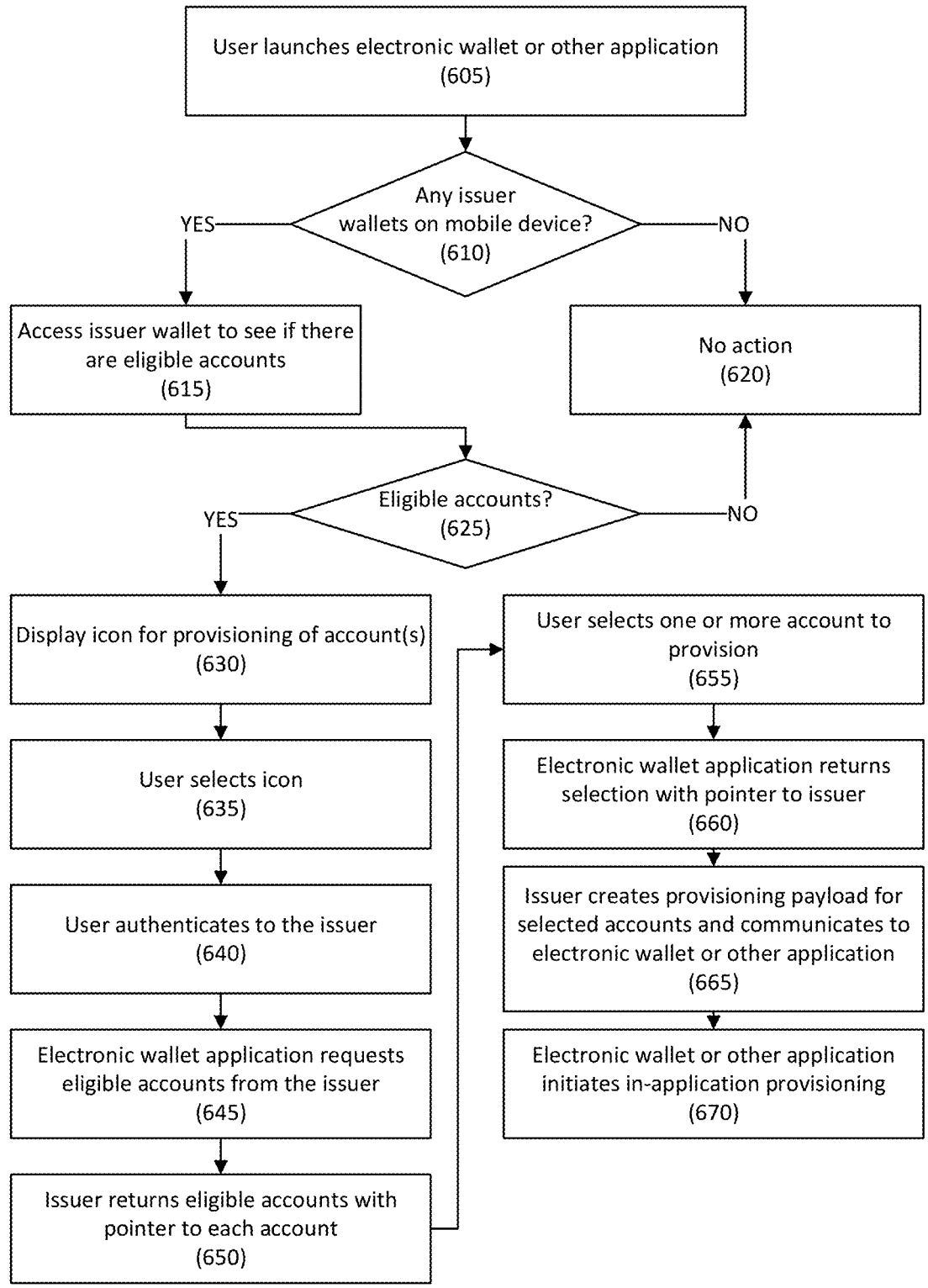
FIG. 6 depicts a method for deterministically linking mobile applications according to another embodiment.

Referring to FIG. 6, a method for deterministically linking mobile applications is disclosed according to another embodiment.

In step 605, a user may access an electronic wallet or other application on a mobile electronic device. This may be similar to step 505, above.

In step 610, the electronic wallet or other application may determine whether there are any issuer electronic wallet or other applications on the mobile electronic device. This may be similar to step 510, above.

If, in step 615, there are no issuer electronic wallet or other applications on the mobile electronic device, in step 620, the process may stop. These steps may be similar to steps 515 and 520, respectively.

If there is one or more issuer electronic wallet or other application on the mobile electronic device, in step 615, the electronic wallet or other application may access the issuer electronic wallet or other application to identify accounts that are eligible for provisioning to the electronic wallet or other application. This may be similar to step 515, above If, in step 625, there are no accounts that are eligible for provisioning to the electronic wallet or other application, in step 620, no action is taken. These steps may be similar to steps 615 and 620, respectively.

If, in step 625, there is one or more account that is eligible for provisioning to the electronic wallet or other application, in step 630, the eligible accounts are displayed in the electronic wallet or other application. In one embodiment, an icon and an account identifier (e.g., the issuer, an account nickname, last four digits of the account number, etc.), may be displayed. These steps may be similar to steps 625 and 630, respectively.

In step 635, the user may select an eligible account from the list presented in the electronic wallet or other application. This may be similar to step 535, above.

In step 640, the user may authenticate to the issuer. In one embodiment, a lightbox or similar may be presented in the electronic wallet or other application, and the user may provide login credentials to the financial institution. In another embodiment, the electronic wallet or other application may launch a browser window and navigate to the issuer for the user to enter login credentials.

The electronic wallet or other application, the issuer, and the electronic device may then establish a secure session using, for example, an OAuth token.

In step 645, using the OAuth token, the electronic wallet or other application may request the one or more eligible accounts from the issuer. In one embodiment, the electronic wallet or other application may use an exposed API.

In step 650, the issuer may return a list of eligible accounts to the electronic wallet or other application. In one embodiment the issuer may return, for example, card art, the last four digits, and a pointer for each account, and may not provide actual account information.

In one embodiment, the issuer may map each account pointer to one of the eligible accounts.

In step 655, the electronic wallet or other application may display the eligible accounts for the user, and the user may select one or more eligible accounts to provision.

In step 670, the electronic wallet or other application may return the selected account(s) and the account pointer(s) with the OAuth token to the issuer. In one embodiment, the electronic wallet or other application may use an exposed API.

In step 665, the issuer may create a provisioning payload for the selected account(s). The issuer may then communicate the provisioning payload to the electronic wallet or other application.

In step 670, the electronic wallet or other application may initiate in-application provisioning using the provisioning payload.

Although several embodiments have been disclosed, these embodiments are not exclusive to each other, and features from one may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for deterministically linking mobile applications, by an electronic wallet computer application executing on a mobile electronic device, comprising:
   determining, by the electronic wallet computer application, that a financial institution mobile application for a financial institution having a plurality of provisioned accounts associated with a customer is present on the mobile electronic device;
   accessing, by the electronic wallet computer application, the financial institution mobile application;
   determining, by the electronic wallet computer application and based on the access to the financial institution mobile application, that there is an account out of the plurality of provisioned accounts that is not provisioned to the electronic wallet computer application and is eligible for provisioning to the electronic wallet computer application;
   displaying, by the electronic wallet computer application, a provisioning icon to provision one of the eligible accounts to the electronic wallet computer application on a display of the mobile electronic device;
   receiving, by the electronic wallet computer application, a selection of the provisioning icon;
   in response to receipt of a selection of the provisioning icon, requesting, by the electronic wallet computer application, login credentials for the financial institution from the customer in a lightbox or a browser window on the mobile electronic device;
   receiving, by the electronic wallet computer application, the login credentials for the customer in the lightbox or the browser window;
   authenticating, by a financial institution backend associated with the financial institution mobile application, the customer using the login credentials;
   initiating, by the electronic wallet computer application, and using an OAuth token, a session with the financial institution backend associated with the financial institution mobile application;
   requesting, by the electronic wallet computer application and with the OAuth token and from the financial institution backend, an identification of an account that is eligible for provisioning to the electronic wallet computer application;
   receiving, by the electronic wallet computer application, a pointer to the account that is eligible for provisioning to the electronic wallet computer application from the financial institution backend;
   displaying, by the electronic wallet computer application, an icon for the account on the display of the mobile electronic device;
   receiving, by the electronic wallet computer application, a selection of the icon for the account;
   communicating, by the electronic wallet computer application, the pointer and the OAuth token to the financial institution backend;
   receiving, by the electronic wallet computer application, a provisioning payload for the account from the financial institution backend; and
   initiating, by the electronic wallet computer application, in-application provisioning of the account using the provisioning payload.

2. The method of claim 1, wherein the electronic wallet computer application comprises a third-party electronic wallet computer application.

3. The method of claim 1, wherein the financial institution mobile application comprises a financial institution electronic wallet computer application.

4. The method of claim 1, verifying, by the electronic wallet computer application, that the financial institution mobile application is present on the mobile electronic device using an API of the mobile electronic device.

5. The method of claim 1, determining, by the electronic wallet computer application determines that there is an account that is eligible for provisioning to the electronic wallet computer application based on the financial institution mobile application.

6. A system, comprising:
   a financial institution backend; and
   a mobile electronic device comprising at least one processor, a display, and an electronic wallet computer application and a financial institution mobile application for a financial institution having a plurality of provisioned accounts associated with a customer, and a memory storing code for a lightbox or a browser window and storing a set of instructions that when executed by the at least one processor, causes the at least one processor to perform the steps of:

determining, via the electronic wallet computer application, that the financial institution mobile application for a financial institution having a plurality of provisioned accounts associated with a customer, is present on the mobile electronic device;

accessing, via the electronic wallet computer application, the financial institution mobile application;

determining, via the electronic wallet computer application and based on the access to the financial institution mobile application, that there is an account out of the plurality of provisioned accounts that is not provisioned to the electronic wallet computer application and is eligible for provisioning to the electronic wallet computer application;

displaying, via the electronic wallet computer application, a provisioning icon to provision one of the eligible accounts to the electronic wallet computer application on the display of the mobile electronic device;

receiving via the electronic wallet computer application, a selection of the provisioning icon;

in response to receipt of a selection of the provisioning icon, requesting, via the electronic wallet computer application, login credentials for the financial institution from the customer in the lightbox or the browser window;

receiving, via the electronic wallet computer application, the login credentials for the customer in the lightbox or the browser window;

authenticating the customer, via the financial institution backend associated with the financial institution mobile application and using the login credentials;

initiating, via the electronic wallet computer application initiates a session with the financial institution backend and using an OAuth token, a session with the financial institution backend associated with the financial institution mobile application;

requesting, via the electronic wallet computer application and with the OAuth token an identification of an account that is eligible for provisioning to the electronic wallet computer application from the financial institution backend;

receiving, via the electronic wallet computer application, a pointer to the account that is eligible for provisioning to the electronic wallet computer application from the financial institution backend;

displaying, via the electronic wallet computer application, an icon representing the account on the display of the mobile electronic device;

receiving, via the electronic wallet computer application, a selection of the icon representing the account;

communicating, via the electronic wallet computer application, the pointer and the OAuth token to the financial institution backend;

receiving, via the electronic wallet computer application, a provisioning payload for the account from the financial institution backend; and initiating, by the electronic wallet computer application, in-application provisioning of the account using the provisioning payload.

7. The system of claim 6, wherein the electronic wallet computer application comprises a third-party electronic wallet computer application.

8. The system of claim 6, wherein the financial institution mobile application comprises a financial institution electronic wallet computer application.

9. The system of claim 6, wherein the memory of the mobile device storing the set of instructions, that when executed by the at least one processor, further causes the at least one processor to perform the step of verifying, via the electronic wallet computer application, that the financial institution mobile application is present on the mobile electronic device using an API of the mobile electronic device.

10. The system of claim 6, wherein the memory of the mobile device storing the set of instructions, that when executed by the at least one processor, further causes the at least one processor to perform the step of determining, via the electronic wallet computer application, that there is an account that is eligible for provisioning to the electronic wallet computer application based on by the financial institution mobile application.

* * * * *